(12) United States Patent
Torii et al.

(10) Patent No.: US 9,600,097 B2
(45) Date of Patent: Mar. 21, 2017

(54) ON-VEHICLE DEVICE OPERATION APPARATUS AND ON-VEHICLE DEVICE OPERATION METHOD

(71) Applicants: FUJITSU TEN LIMITED, Kobe-shi, Hyogo (JP); HONDA MOTOR CO., LTD., Tokyo (JP)

(72) Inventors: Tomohiko Torii, Kobe (JP); Nobuaki Kajimoto, Kobe (JP); Takanori Fujiwara, Kobe (JP); Xin Sun, Kobe (JP); Shimpei Moriyama, Kobe (JP); Takeshi Matsukawa, Kobe (JP); Tasuku Saka, Wako (JP)

(73) Assignees: FUJITSU TEN LIMITED, Kobe-shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/018,187

(22) Filed: Feb. 8, 2016

(65) Prior Publication Data
US 2016/0239115 A1    Aug. 18, 2016

(30) Foreign Application Priority Data

Feb. 13, 2015  (JP) .................................. 2015-026772

(51) Int. Cl.
*G06F 3/0354*   (2013.01)
*G06F 3/147*    (2006.01)
(Continued)

(52) U.S. Cl.
CPC .......... *G06F 3/03547* (2013.01); *B60K 35/00* (2013.01); *B60K 37/06* (2013.01);
(Continued)

(58) Field of Classification Search
CPC ..... G06F 3/00; G06F 3/01; G06F 3/02; G06F 3/0227; G06F 3/023; G06F 3/0236;
(Continued)

(56) References Cited

U.S. PATENT DOCUMENTS 7,738,912 B1 *  6/2010  Hawkins ......... H04M 1/274558
                                              455/550.1
9,122,356 B2 *  9/2015  Ozias .................. G06F 3/03547
(Continued)

FOREIGN PATENT DOCUMENTS

GB          2283714 A  *  5/1995  ............. B60K 37/06
JP       2005-313722 A     11/2005
(Continued)

*Primary Examiner* — Thomas G Black
*Assistant Examiner* — Sara Lewandroski
(74) *Attorney, Agent, or Firm* — Oliff PLC

(57) ABSTRACT

An on-vehicle device operation apparatus according to an embodiment includes an operation part, an on-vehicle device control part, and a display control part. The operation part is provided in an inside of a vehicle and includes a plurality of operation switches. When one of the operation switches is pushed, the on-vehicle device control part controls an on-vehicle device depending on the pushed operation switch. The display control part causes a display part to display an image corresponding to the operation part. when a first operation switch with no assigned operation among the plurality of operation switches is pushed, the display control part causes the display part to emphatically display a portion corresponding to the first operation switch in the image corresponding to the operation part.

6 Claims, 5 Drawing Sheets

(51) Int. Cl.
    *B60K 37/06*     (2006.01)
    *B60K 37/02*     (2006.01)
    *B60K 35/00*     (2006.01)
    *G06F 3/023*     (2006.01)

(52) U.S. Cl.
    CPC   *B60K 2350/1016* (2013.01); *B60K 2350/928* (2013.01); *G06F 3/0238* (2013.01); *G06F 3/147* (2013.01); *G09G 2380/10* (2013.01)

(58) Field of Classification Search
    CPC .......... G06F 3/0238; G06F 3/03; G06F 3/033; G06F 3/0338; G06F 3/0362; G06F 3/038; G06F 3/0383; G06F 3/0484; G06F 3/04842; G06F 3/14; G06F 3/1415; G06F 3/1454; G06F 3/1462; B60K 37/06; B60K 37/00; B60K 37/02; B60K 37/046; B60K 2350/925; B60K 2350/928; B60K 2350/1008; B60K 2350/1012; B60K 2350/1024; B60K 2350/1032; B60K 2350/1036; B60K 2350/1016; B60K 2350/104; G09G 2380/10
    See application file for complete search history.

(56) References Cited

U.S. PATENT DOCUMENTS

| | | | | |
|---|---|---|---|---|
| 2002/0171685 A1* | 11/2002 | Christianson | ...... | H04N 1/00384 715/835 |
| 2003/0023353 A1* | 1/2003 | Badarneh | ...... | B60K 35/00 701/1 |
| 2004/0138795 A1* | 7/2004 | Alkarawi | ...... | G06F 3/0238 701/36 |
| 2005/0090954 A1* | 4/2005 | Mansell | ...... | A61G 5/04 701/36 |
| 2007/0063980 A1* | 3/2007 | Eich | ...... | G06F 3/0219 345/173 |
| 2007/0273657 A1* | 11/2007 | Oki | ...... | B60K 37/06 345/172 |
| 2008/0200245 A1* | 8/2008 | Trobia | ...... | G07F 17/3211 463/30 |
| 2010/0204915 A1* | 8/2010 | Kuenzner | ...... | B60K 37/06 701/533 |
| 2012/0260164 A1* | 10/2012 | Scheufler | ...... | B60K 35/00 715/702 |
| 2015/0012826 A1* | 1/2015 | Tengstrand | ...... | G06F 3/04842 715/717 |
| 2015/0029106 A1* | 1/2015 | Boebinger | ...... | G06F 3/0213 345/172 |
| 2015/0145790 A1* | 5/2015 | Kim | ...... | G02B 27/01 345/173 |
| 2015/0241988 A1* | 8/2015 | Ohashi | ...... | H04N 5/23293 345/172 |
| 2015/0344059 A1* | 12/2015 | Kim | ...... | B62D 1/046 74/552 |
| 2016/0034238 A1* | 2/2016 | Gerlach | ...... | G06F 3/04817 345/1.1 |
| 2016/0124623 A1* | 5/2016 | Chang | ...... | G06F 3/04847 715/771 |

FOREIGN PATENT DOCUMENTS

| | | |
|---|---|---|
| JP | 2006-099178 A | 4/2006 |
| JP | 2013-006472 A | 1/2013 |

* cited by examiner

FIG.6
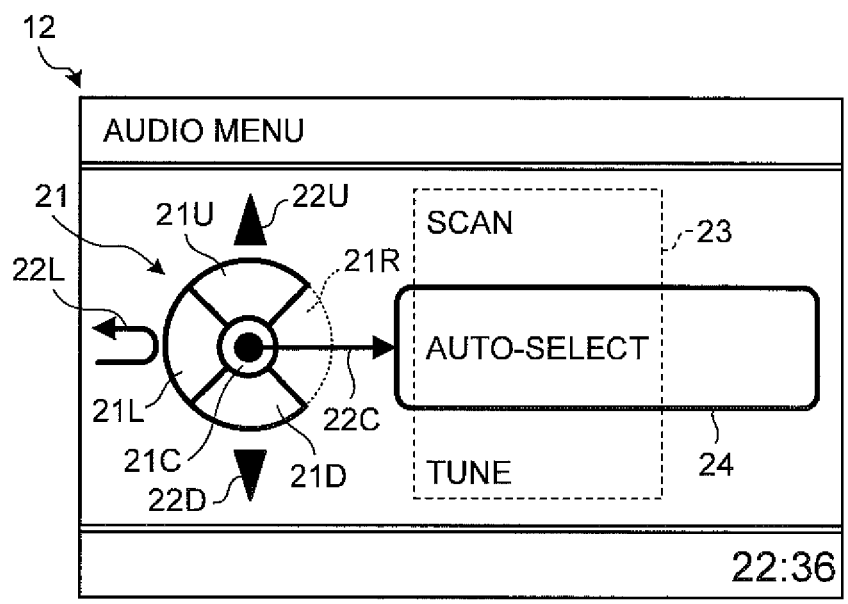
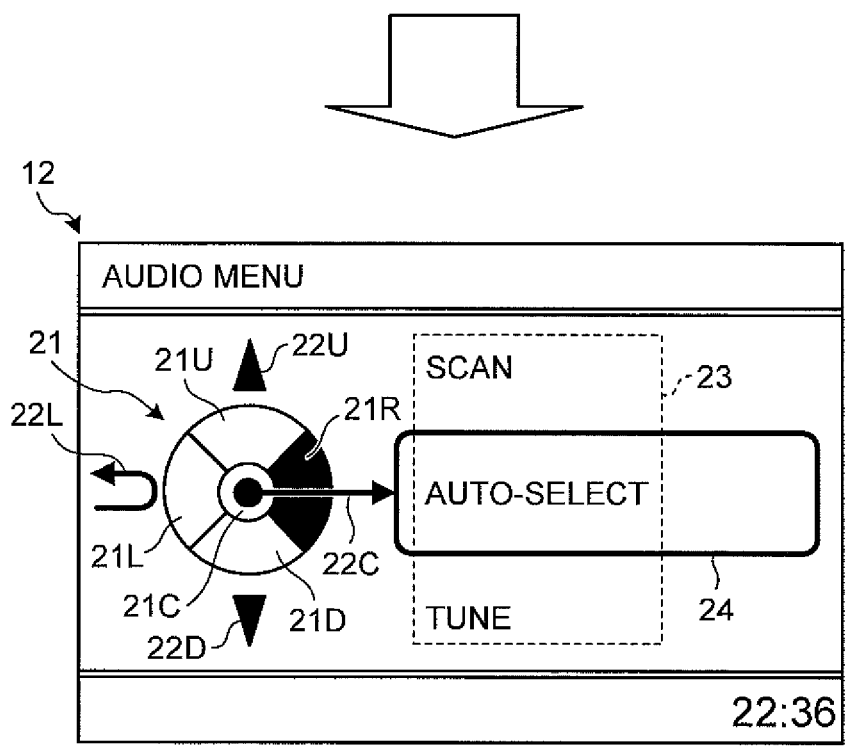

FIG.7
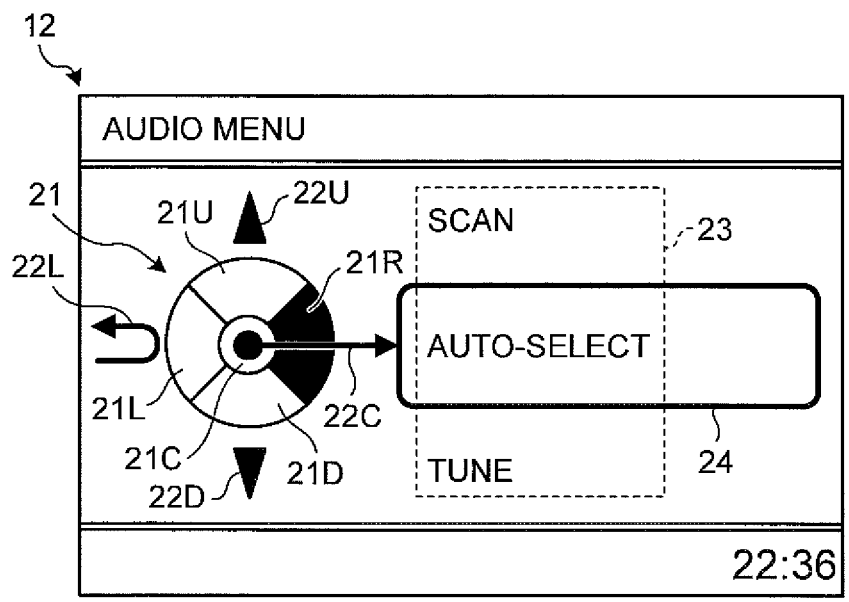
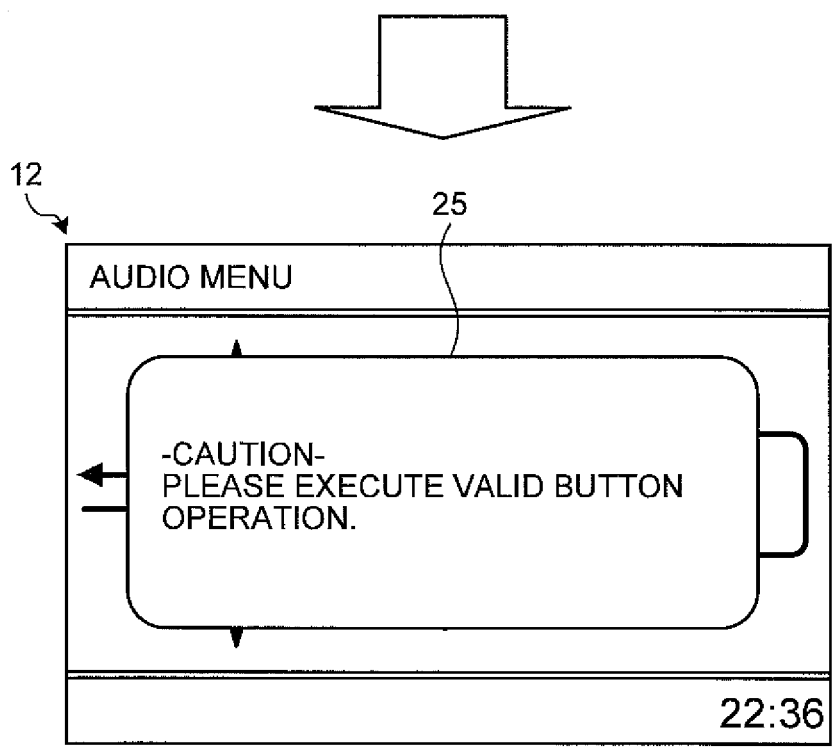

_US 9,600,097 B2_

ON-VEHICLE DEVICE OPERATION APPARATUS AND ON-VEHICLE DEVICE OPERATION METHOD

CROSS-REFERENCE TO RELATED APPLICATION

This application is based upon and claims the benefit of priority of the prior Japanese Patent Application No. 2015-026772, filed on Feb. 13, 2015, the entire contents of which are incorporated herein by reference.

FIELD

The embodiment(s) discussed herein is (are) directed to an on-vehicle device operation apparatus and an on-vehicle device operation method.

BACKGROUND

An on-vehicle device operation apparatus has conventionally been known that uses an operation part arranged near a driver, for example, a steering switch, to execute an operation for an on-vehicle device such as a car audio device or a car air-conditioner (see Japanese Laid-open Patent Publication No. 2013-006472).

However, there has been room for further improvement in a conventional on-vehicle device operation apparatus in that operability thereof is improved.

For example, when a user pushes a switch with no assigned operation among a plurality of operation switches provided in an operation part of a conventional on-vehicle device operation apparatus, the user could not distinguish between failing to push an operation switch and an on-vehicle device being unresponsive and might be confused thereby.

SUMMARY

It is an object of the present invention to at least partially solve the problems in the conventional technology.

An on-vehicle device operation apparatus according to an embodiment includes an operation part, an on-vehicle device control part, and a display control part. The operation part is provided in an inside of a vehicle and includes a plurality of operation switches. When one of the operation switches is pushed, the on-vehicle device control part controls an on-vehicle device depending on the pushed operation switch. The display control part causes a display part to display an image corresponding to the operation part. when a first operation switch with no assigned operation among the plurality of operation switches is pushed, the display control part causes the display part to emphatically display a portion corresponding to the first operation switch in the image corresponding to the operation part.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

More complete recognition of the present invention and benefit involved therewith could readily be understood when reading the following detailed description of the invention in light of the accompanying drawings:

FIG. 6 is a diagram illustrating a display control process according to a first modification; and FIG. 7 is a diagram illustrating a display control process according to a second modification.

DESCRIPTION OF EMBODIMENTS

An embodiment of an on-vehicle device operation apparatus and an on-vehicle operation method according to the present invention will hereinafter be described in detail, with reference to the accompanying drawings. This invention is not limited to this embodiment.

Configuration of Vehicle

Figure 1:
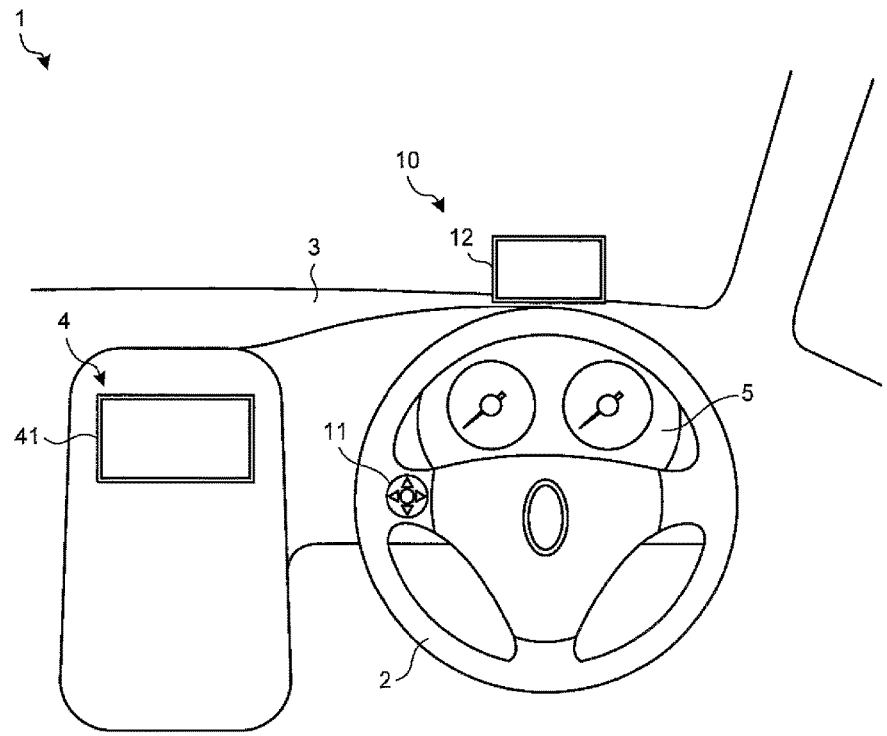
FIG. 1 is a diagram illustrating a configuration example of a vehicle with an on-vehicle device operation apparatus being mounted thereon according to an embodiment.

FIG. 1 is a diagram illustrating a configuration example of a vehicle with an on-vehicle device operation apparatus being mounted thereon according to the present embodiment. FIG. 1 is a schematic diagram when a front side of a vehicle 1 is viewed from an indoor side of the vehicle 1.

As illustrated in FIG. 1, an on-vehicle device operation apparatus 10 is configured to include an operation part 11 and a display part 12. The operation part 11 is, for example, a steering switch, and is provided on a steering wheel 2 of the vehicle 1. The operation part 11 has a plurality of operation buttons. The display part 12 is provided on, for example, a dashboard 3 in front of a driver's seat of the vehicle 1.

The on-vehicle device operation apparatus 10 receives an operation of a user (mainly, a driver) on the operation part 11 and controls an on-vehicle device 4 depending on the received operation. The on-vehicle device 4 is, for example, a car navigation device, and the on-vehicle device operation apparatus 10 controls a car audio function possessed by the on-vehicle device 4 depending on an operation received on the operation part 11, and thereby, can execute "auto-select", "scan", or the like.

The on-vehicle device operation apparatus 10 causes the display part 12 to display an image corresponding to the operation part 11 together with content of an operation assigned to each operation switch of the operation part 11.

Herein, in a case where a user pushes a switch with no assigned operation among a plurality of operation switches provided in an operation part of a conventional on-vehicle device operation apparatus, the user could not distinguish between failing to push an operation switch and an on-vehicle device being unresponsive and might be confused thereby.

In a case where an operation switch with no assigned operation (that will hereinafter be described as an "invalid switch") is pushed in the on-vehicle device operation apparatus according to the present embodiment, a portion corresponding to the invalid switch pushed by a user is emphatically displayed in an image corresponding to the operation part 11 and displayed on the display part 12. Thereby, the user can recognize that an operation switch could have been pushed, in other words, the operation switch has not been failed to push. Therefore, the on-vehicle device operation apparatus 10 according to the present embodiment can improve operability thereof.

Hereinafter, a configuration and an action of the on-vehicle device operation apparatus 10 according to the present embodiment will be described specifically.

Although the present embodiment will be described by exemplifying a case where the on-vehicle device operation apparatus 10 controls a car audio function of the on-vehicle device 4 that is a car navigation device, the on-vehicle device 4 is not limited to the car navigation device and further a function of the on-vehicle device 4 to be controlled by the on-vehicle device operation apparatus 10 is also not limited to the car audio function. For example, the on-vehicle device operation apparatus 10 may control an air-conditioning function (such as air volume control, temperature control, or heating-cooling switching) of a car air-conditioner provided on the vehicle 1.

Although the present embodiment will be described by exemplifying a case where the on-vehicle device operation apparatus 10 is configured to include the display part 12, the on-vehicle device operation apparatus 10 is not necessarily needed to be configured to include the display part 12. For example, the on-vehicle device operation apparatus 10 may cause a display part 41 that is included in the on-vehicle device 4, a meter panel 5 provided in front of a driver's seat of the vehicle 1, or a Head Up Display (HUD) (not-illustrated) to display information.

Although the present embodiment will be described by exemplifying a case where the operation part 11 of the on-vehicle device operation apparatus 10 is provided on the steering wheel 2, the operation part 11 is not necessarily needed to be provided on the steering wheel 2 as long as the operation part 11 is provided in a room of the vehicle 1.

An "operation" in the present specification includes not only an operation for executing a function of the on-vehicle device 4 but also an operation for selecting a function to be executed by the on-vehicle device 4.

Configuration of on-Vehicle Device Operation Apparatus

Figure 2:
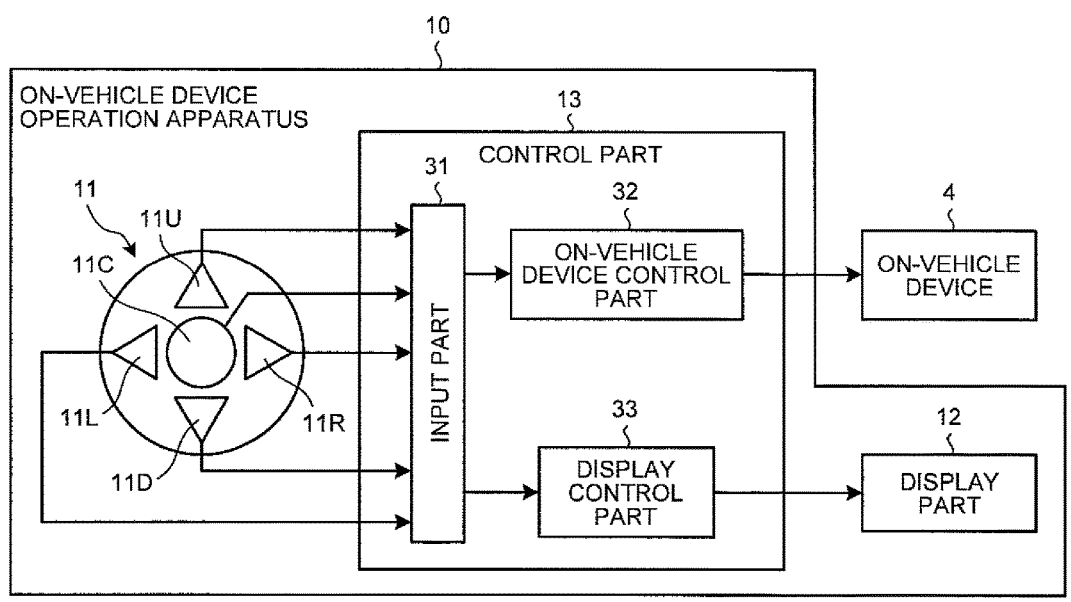
FIG. 2 is the diagram illustrating a configuration example of an on-vehicle device operation apparatus.

FIG. 2 is a diagram illustrating a configuration example of the on-vehicle device operation apparatus 10. As illustrated in FIG. 2, the on-vehicle device operation apparatus 10 includes the operation part 11, the display part 12, and a control part 13.

The operation part 11 includes a plurality of operation switches. Specifically, the operation part 11 includes an up switch 11U, a down switch 11D, a left switch 11L, a right switch 11R, and a center switch 11C. The display part 12 is, for example, a liquid crystal display.

The control part 13 includes an input part 31, an on-vehicle device control part 32, and a display control part 33. The control part 13 includes, for example, a microcomputer that has a Central Processing Unit (CPU), a Read Only Memory (ROM), a Random Access Memory (RAM), an input-output port, and the like, and a variety of circuits. The CPU of the microcomputer reads and executes a program stored in the ROM, and thereby, functions as the input part 31, the on-vehicle device control part 32, and the display control part 33. The control part 13 may only be composed of hardware without using a program.

The input part 31 is connected to, for example, the operation switches 11U, 11D, 11L, 11R, and 11C of the operation part 11 through wires, and detects that the operation switch 11U, 11D, 11L, 11R, or 11C is pushed by a user. As the input part 31 detects a push of the operation switch 11U, 11D, 11L, 11R, or 11C, a signal corresponding to the pushed operation switch 11U, 11D, 11L, 11R, or 11C is output to the on-vehicle device control part 32 and the display control part 33.

In a case where the on-vehicle device control part 32 acquires a signal from the input part 31, a control signal dependent on the operation switch 11U, 11D, 11L, 11R, or 11C corresponding to the acquired signal is output to the on-vehicle device 4. Thereby, the on-vehicle device 4 executes a function such as "AUTO-SELECT" or "SCAN" in accordance with a control signal acquired from the on-vehicle device control part 32.

Figure 3:
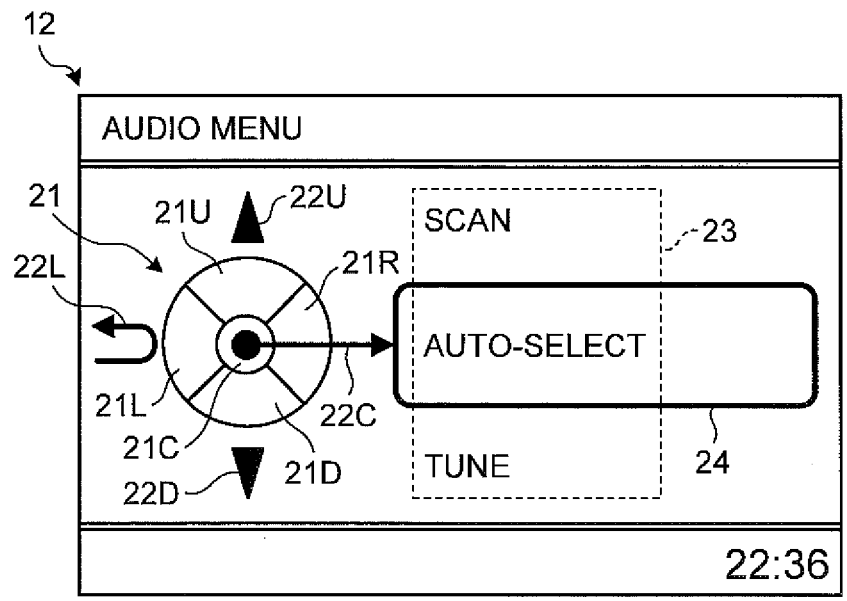
FIG. 3 and FIG. 4 are diagrams illustrating examples of a screen to be displayed on a display part.

The display control part 33 causes the display part 12 to display an image corresponding to the operation part 11 together with content of an operation assigned to each operation switch 11U, 11D, 11L, 11R, or 11C of the operation part 11. Herein, an example of a screen to be displayed on the display part 12 will be described with reference to FIG. 3. FIG. 3 is a diagram illustrating an example of a screen to be displayed on the display part 12.

As illustrated in FIG. 3, an image 21 corresponding to the operation part 11 (that will hereinafter be described as an "operation part image") is displayed on the display part 12. The operation part image 21 is configured to include an up switch image 21U corresponding to the up switch 11U, a down switch image 21D corresponding to the down switch 11D, a left switch image 21L corresponding to the left switch 11L, a right switch image 21R corresponding to the right switch 11R, and a center switch image 21C corresponding to the center switch 11C. A positional relationship among the up switch image 21U, the down switch image 21D, the left switch image 21L, the right switch image 21R, and the center switch image 21C in the operation part image 21 is identical to a positional relationship among the up switch 11U, the down switch 11D, the left switch 11L, the right switch 11R, and the center switch 11C in the operation part 11.

A list image 23 that includes functional item names to be executed by the on-vehicle device 4 and a cursor image 24 that surrounds one of the item names included in the list image 23 are displayed on the display part 12. The list image 23 and the cursor image 24 are displayed adjacent to the operation part image 21.

Schematic figures of content of operations assigned to the operation switches 11U, 11D, 11L, and 11C of the operation part 11 are displayed on the display part 12. In an audio menu screen illustrated in FIG. 3, an operation for upwardly moving the cursor image 24 displayed on the display part 12 is assigned to the up switch 11U and an operation for downwardly moving the cursor image 24 is assigned to the down switch 11D. An operation for executing transition to a screen at a hierarchy level one higher than that of the audio menu screen illustrated in FIG. 3 is assigned to the left switch 11L, and an operation for executing, on the on-vehicle device 4, a function corresponding to an item name surrounded by the cursor image 24 among item names included in the list image 23 is assigned to the center switch 11C.

In this case, as illustrated in FIG. 3, schematic figure images 22U, 22D, 22L, and 22C of contents of operations assigned to the up switch 11U, the down switch 11D, the left switch 11L, and the center switch 11C are respectively displayed at an upper side of the up switch image 21U, a lower side of the down switch image 21D, a left side of the left switch image 22L, and a right side of the center switch image 21C on the display part 12.

In a case where the display control part 33 acquires a signal from the input part 31, display content of the display part 12 is changed according to content of an operation assigned to the operation switch 11U, 11D, 11L, 11R, or 11C corresponding to the acquired signal.

For example, in a case where a user pushes the up switch 11U in a state illustrated in FIG. 3, the display control part 33 moves the cursor image 24 upwardly so as to provide a situation that "SCAN" included in the list image 23 is surrounded by the cursor image 24. The display control part 33 may execute a process for moving down positions of item names included in the list image 23 instead of a process for moving up the cursor image 24.

In a case where a user pushes the left switch 11L in the state illustrated in FIG. 3, the display control part 33 executes transition to a screen at a hierarchy level one higher than that of the audio menu screen illustrated in FIG. 3. In a case where a user pushes the center switch 11C in the state illustrated in FIG. 3, the display control part 33 causes the display part 12 to display a screen corresponding to an item name of the list image 23 being surrounded by the cursor image 24.

As screen transition from the audio menu image illustrated in FIG. 3 is caused by these operations, content of an operation being different from content of an operation assigned in the audio menu screen illustrated in FIG. 3 is assigned to each operation switch 11U, 11D, 11L, 11R, or 11C of the operation part 11.

Figure 4:
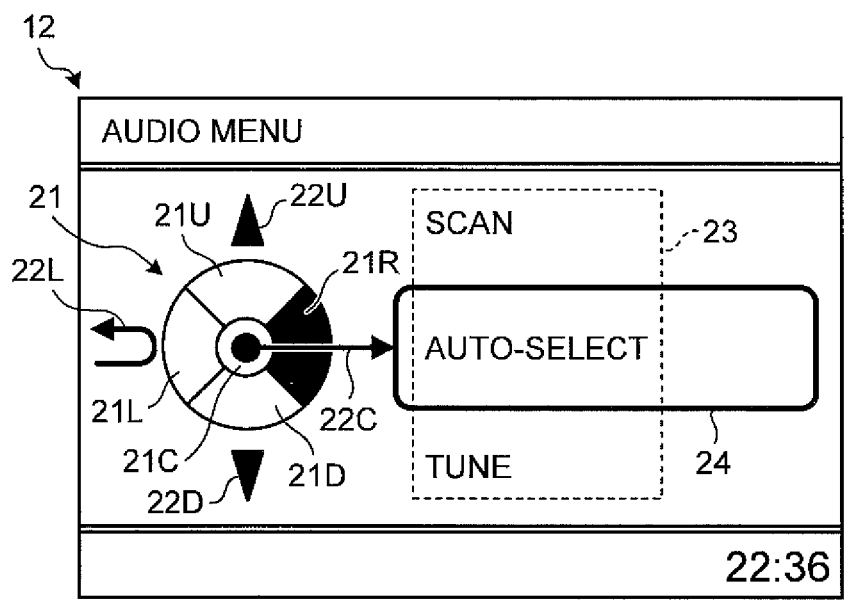

In the audio menu screen illustrated in FIG. 3, the right switch 11R is an invalid switch with no assigned operation. In a case where a user pushes the right switch 11R that is an invalid switch, the display control part 33 causes the display part 12 to emphatically display the right switch image 21R that is a portion corresponding to the right switch 11R in the operation part image 21. Such a matter will be described with reference to FIG. 4. FIG. 4 is a diagram illustrating an example of a screen to be displayed on the display part 12. FIG. 4 illustrates an example of a screen to be displayed on the display part 12 in a case where a user pushes the right switch 11R in the state illustrated in FIG. 3.

As the right switch 11R with no assigned operation is pushed, the display control part 33 causes the display part 12 to display the right switch image 21R corresponding to the right switch 11R brighter than a normal state, that is, brightens the right switch image 21R, as illustrated in FIG. 4.

If the right switch image 21R was not emphatically displayed, a user having pushed the right switch 11R could not distinguish between failing to the right switch 11R and the on-vehicle device operation apparatus or the on-vehicle device 4 being unresponsive and might be confused thereby. On the other hand, when the right switch 11R that is an invalid switch is pushed, the on-vehicle device operation apparatus 10 according to the present embodiment causes the display part 12 to emphatically display the right switch image 21R, and thereby, causes a user to recognize that an operation of a push of the right switch 11R is received normally. Therefore, a user is not confused as described above but can instantaneously perceive that the right switch 11R is an invalid switch.

Thus, the on-vehicle device operation apparatus 10 according to the present embodiment executes emphatic display and thereby can improve an operability of a user even if an operation switch with no assigned operation is pushed.

Steps of Display Control Process

Figure 5:
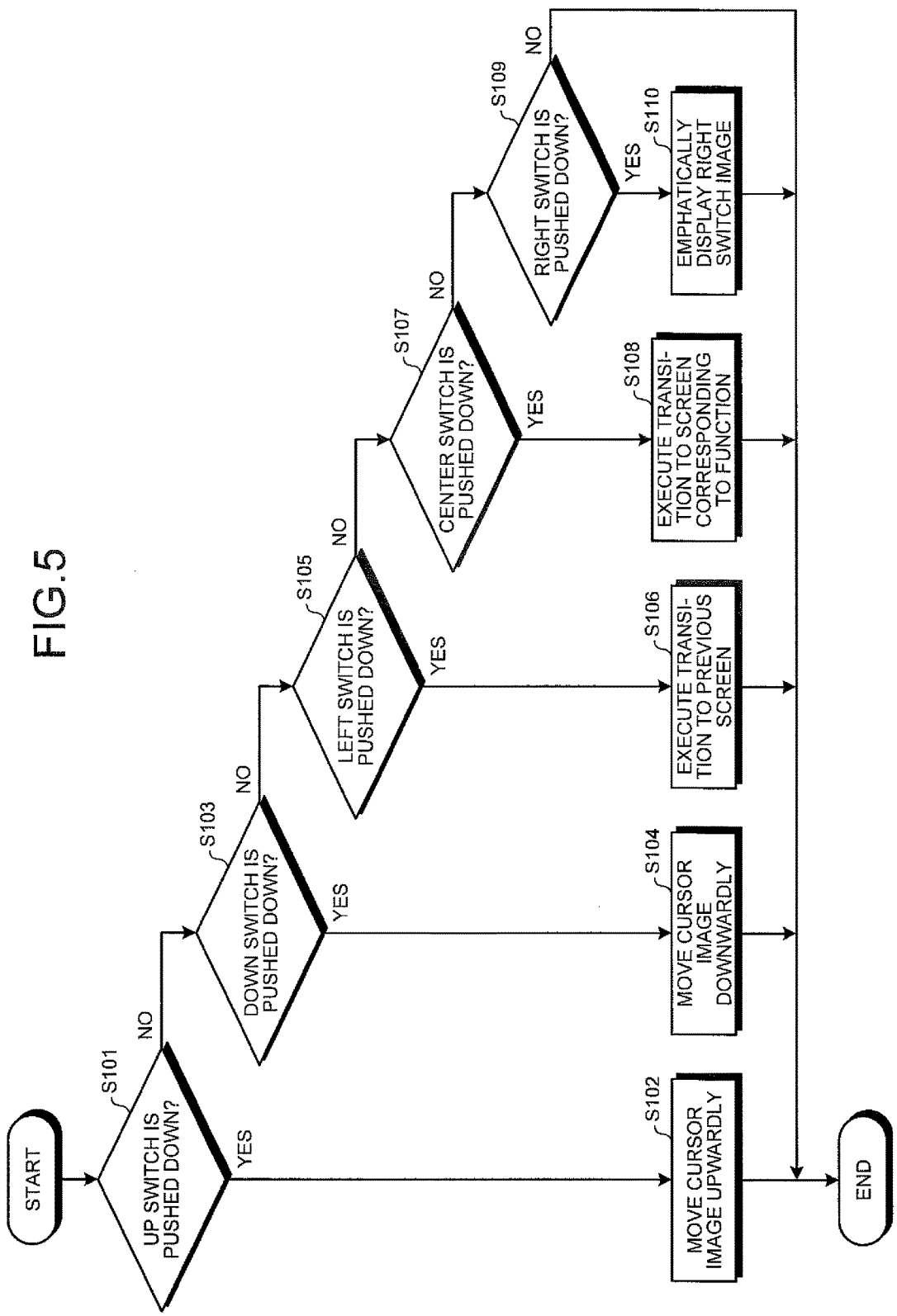
FIG. 5 is a flowchart illustrating steps of a display control process.

Next, steps of a display control process to be executed by the on-vehicle device operation apparatus 10 will be described with reference to FIG. 5. FIG. 5 is a flowchart illustrating steps of a display control process. FIG. 5 illustrates steps of a display control process in a case where the audio menu screen illustrated in FIG. 3 is displayed on the display part 12.

As illustrated in FIG. 5, the control part 13 of the on-vehicle device operation apparatus 10 determines whether or not the up switch 11U is pushed (step S101), and if determination is provided in such a manner that the up switch 11U is pushed (step S101, Yes), the cursor image 24 is moved upwardly (step S102).

At step S101, if the up switch 11U is not pushed (step S101, No), the control part 13 determines whether or not the down switch 11D is pushed (step S103). If determination is provided in such a manner that the down switch 11D is pushed (step S103, Yes), the control part 13 moves the cursor image 24 downwardly (step S104).

At step S103, if the down switch 11D is not pushed (step S103, No), the control part 13 determines whether or not the left switch 11L is pushed (step S105). If determination is provided in such a manner that the left switch 11L is pushed (step S105, Yes), the control part 13 executes transition to a screen (previous screen) at a hierarchy level one higher than that of the audio menu screen illustrated in FIG. 3 (step S106).

At step S105, if the left switch 11L is not pushed (step S105, No), the control part 13 determines whether or not the center switch 11C is pushed (step S107). If determination is provided in such a manner that the center switch 11C is pushed (step S107, Yes), the control part 13 executes transition to a screen corresponding to a function ("AUTO-SELECT" in FIG. 3) selected by a user (step S108).

At step S107, if the center switch 11C is not pushed (step S107, No), the control part 13 determines whether or not the right switch 11R that is an invalid switch is pushed (step S109). If determination is provided in such a manner that the right switch 11R is pushed (step S109, Yes), the control part 13 emphatically display the right switch image 21R corresponding to the right switch 11R (step S110).

As described above, the on-vehicle device operation apparatus 10 according to the present embodiment includes the operation part 11, the on-vehicle device control part 32, and the display control part 33. The operation part 11 is provided in a room of the vehicle 1 and has the plurality of operation switches 11U, 11D, 11L, 11R, and 11C. In a case where the operation switch 11U, 11D, 11L, 11R, or 11C is pushed, the on-vehicle device control part 32 controls the on-vehicle device 4 depending on the pushed operation switch 11U, 11D, 11L, 11R, or 11C. The display control part 33 causes the display part 12 to display the operation part image 21 corresponding to the operation part 11. If the operation switch with no assigned operation (herein, the right switch 11R) is pushed, the display control part 33 causes the display part 12 to emphatically display a portion (herein, the right switch image 21R) corresponding to the operation switch in the operation part image 21. Therefore, the on-vehicle device operation apparatus 10 according to the present embodiment can improve operability thereof.

Even if the up switch 11U, the down switch 11D, the left switch 11L and the center switch 11C that are operation switches other than an invalid switch are pushed, the on-vehicle device operation apparatus 10 according to the present embodiment executes emphatic display of the up switch image 21U, the down switch image 21D, the left switch image 21L, and the center switch image 21C that correspond thereto, but this does not have to be executed. This is because an obstruction could be caused in driving if, every time the operation switch 11U, 11D, 11L, 11R, or 11C is pushed, the corresponding operation switch image 21U, 21D, 21L, 21R, or 21C was displayed emphatically. Thereby, only if the right switch 11R that is an invalid switch is pushed, the corresponding right switch image 21R is emphatically displayed so that a driver that is a user can be caused to recognize that an invalid switch is pushed without causing obstruction in driving.

First Modification

Next, a first modification of the on-vehicle device operation apparatus 10 described above will be described with reference to FIG. 6. FIG. 6 is a diagram illustrating a display control process according to the first modification.

As illustrated in an upper diagram of FIG. 6, the display control part 33 may cause the display part 12 to preliminarily and emphatically display the up switch image 21U, the down switch image 21D, the left switch image 21L, and the center switch image 21C that correspond to the up switch 11U, the down switch 11D, the left switch 11L, and the center switch 11C that are assigned with operations. Thereby, a user can readily recognize that the up switch 11U, the down switch 11D, the left switch 11L, and the center switch 11C are valid operation switches.

The display control part 33 may display the right switch image 21R that is an invalid switch, with reduced visibility, such as display by a broken line or brightness less than that of a normal state. Thereby, a user can readily recognize that the right switch 11R is an invalid operation switch.

In a case where the right switch 11R that is an invalid switch is pushed, the display control part 33 may cause the display part 12 to emphatically display the right switch image 21R in a manner different from those of the up switch image 21U, the down switch image 21D, the left switch image 21L, and the center switch image 21C, as illustrated in a lower diagram of FIG. 6. Thereby, a user can recognize that an operation of a push of the right switch 11R is received normally.

In this case, the display control part 33 may cancel emphatic display of the up switch image 21U, the down switch image 21D, the left switch image 21L, and the center switch image 21C. Thereby, a degree of emphasis of the up switch image 21U, the down switch image 21D, the left switch image 21L, and the center switch image 21C is reduced, and thereby, the right switch 11R can further be emphasized. The display control part 33 may provide display of the up switch image 21U, the down switch image 21D, the left switch image 21L, and the center switch image 21C, with reduced visibility such as display by a broken line or brightness less than that of a normal state.

<Second Modification>

Next, a second modification of the on-vehicle device operation apparatus 10 will be described with reference to FIG. 7. FIG. 7 is a diagram illustrating a display control process according to the second modification.

As illustrated in FIG. 7, in a case where the right switch 11R that is an invalid switch is pushed, the display control part 33 causes the display part 12 to emphatically displays the right switch image 21R (see an upper diagram of FIG. 7) and may cause the display part 12 to display a predetermined message image 25 for recognizing that the invalid switch is operated (see a lower diagram of FIG. 7). Thereby, a user can more instantaneously recognize that the invalid switch is operated.

Herein, an example of a case where the message image 25 is superimposed on and displayed with the operation part image 21 has been illustrated, but the display control part 33 may cause the display part 12 to display the message image 25 at a position where the message image 25 is not superimposed on the operation part image 21, for example, adjacent to the operation part image 21. Thereby, a user can visually recognize both the emphatically displayed right switch image 21R and the message image 25.

Other Modifications

A user might push the right switch 11R due to an operation mistake or the like, despite recognition that the right switch 11R is an invalid switch. In such a situation, the display control part 33 may cause the display part 12 to display the message image 25 in a case where elapsed time after the right switch 11R is pushed exceeds a predetermined threshold. Thereby, a message can be presented to a user with more proper timing.

For a reason similar to the above, the display control part 33 may cause the display part 12 to emphatically display the right switch image 21R in a case where the number of pushes of the right switch 11R exceeds a predetermined threshold. Thereby, timing to emphatically display the right switch image 21R can be optimized. The display control part 33 may cause the display part 12 to emphatically display the right switch image 21R in a case where elapsed time after the right switch 11R is pushed exceeds a predetermined threshold.

The display control part 33 may change a manner of emphatic display of the right switch image 21R depending on the number of pushes of the right switch 11R. For example, brightness of the right switch image 21R may be increased or a color thereof may be changed, as the number of pushes of the right switch 11R is increased.

The display control part 33 may maintain emphatic display of the right switch image 21R while the right switch 11R is pushed. In this case, the display control part 33 may change a manner of the emphatic display similarly to the above, depending on a duration after the right switch 11R is pushed.

Although some embodiments of an on-vehicle device operation apparatus and an on-vehicle operation method according to the present application have hereinbefore been described in detail based on the drawings, these are illustrations and it is possible to implement the present invention in other modes with a variety of modifications or improvements applied based on knowledge of a person skilled in the art.

As described above, according to an aspect of the embodiments, operability can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An on-vehicle device operation apparatus, comprising:
   an operation part that is provided in an inside of a vehicle and includes a plurality of operation switches;
   an on-vehicle device control part that, when one of the operation switches is pushed, controls an on-vehicle device depending on the pushed operation switch; and
   a display control part that causes a display part to display an image corresponding to the operation part and determines, when an operation switch among the plurality of operation switches is pushed, whether the pushed switch is a first operation switch with no assigned operation or a second operation switch with an assigned operation, wherein the image corresponding to the operation part includes a first portion corresponding to the first operation switch and a second portion corresponding to the second operation switch, and the second portion is preliminarily displayed emphatically, and wherein when it is determined that the first operation switch is pushed, the display control part causes the display part to emphatically display the first portion corresponding to the pushed first operation switch in a manner different from that of the second portion.

2. The on-vehicle device operation apparatus as claimed in claim 1, wherein the operation part is provided on a steering wheel of the vehicle.

3. The on-vehicle device operation apparatus as claimed in claim 1, wherein when the first operation switch is pushed, the display control part causes the display part to emphatically display the first portion corresponding to the pushed first operation switch and to display a predetermined message.

4. The on-vehicle device operation apparatus as claimed in claim 3, wherein when elapsed time after the first operation switch is pushed exceeds a predetermined threshold, the display control part causes the display part to display the predetermined message.

5. The on-vehicle device operation apparatus as claimed in claim 1, wherein when a number of pushes of the first operation switch exceeds a predetermined threshold, the display control part causes the display part to emphatically display the first portion corresponding to the pushed first operation switch.

6. An on-vehicle device operation method, comprising:

controlling, when one of a plurality of operation switches of an operation part that is provided in an inside of a vehicle is pushed, an on-vehicle device depending on the pushed operation switch;

causing a display part to display an image corresponding to the operation part; and determining, when an operation switch among the plurality of operation switches is pushed, whether the pushed switch is a first operation switch with no assigned operation or a second operation switch with an assigned operation, wherein the image corresponding to the operation part includes a first portion corresponding to the first operation switch and a second portion corresponding to the second operation switch, and the second portion is preliminarily displayed emphatically, and wherein when it is determined that the first operation switch is pushed, the causing includes causing the display part to emphatically display the first portion corresponding to the pushed first operation switch in a manner different from that of the second portion.

* * * * *